United States Patent [19]

Kopp

[11] Patent Number: 4,645,062
[45] Date of Patent: Feb. 24, 1987

[54] TRANSFER APPARATUS FOR FLAT ITEMS

[75] Inventor: Georg Kopp, Uhwiesen, Switzerland

[73] Assignee: SIG Schweizerische Industrie-Gesellschaft, Neuhausen am Rheinfall, Switzerland

[21] Appl. No.: 731,957

[22] Filed: May 8, 1985

[30] Foreign Application Priority Data

May 9, 1984 [CH] Switzerland ............ 2274/84

[51] Int. Cl.$^4$ .............. B65G 47/68; B65G 19/28
[52] U.S. Cl. .................. 198/448; 198/463.2; 198/735
[58] Field of Search ............ 198/456, 733, 735, 463.2, 198/861.2, 631, 433, 457, 448, 449, 803.14

[56] References Cited

U.S. PATENT DOCUMENTS

| Re. 27,190 | 10/1971 | Porcaro | 198/456 |
|---|---|---|---|
| 2,790,531 | 4/1957 | McVicker et al. | 198/448 |
| 3,081,859 | 3/1963 | Meyer et al. | 198/456 |
| 3,166,181 | 1/1965 | Rutkus et al. | 198/457 |
| 3,228,513 | 1/1966 | Voullaire | 198/456 |
| 3,603,462 | 9/1971 | Moser | 198/631 |
| 3,776,344 | 12/1973 | Harrison | 198/457 |
| 3,844,403 | 10/1974 | Stauber | 198/861.2 |
| 4,043,442 | 8/1977 | Greenwell et al. | 198/433 |
| 4,147,252 | 4/1979 | Burkhardt | 198/735 |
| 4,371,156 | 2/1983 | Pessina et al. | 198/735 |

FOREIGN PATENT DOCUMENTS 621528 2/1981 Switzerland.

Primary Examiner—Joseph E. Valenza
Assistant Examiner—Daniel R. Alexander
Attorney, Agent, or Firm—Spencer & Frank

[57] ABSTRACT

An apparatus has a first conveyor and a second conveyor to which flat items are transferred, in a substantially lying orientation, from the first conveyor at a location of transfer; an item supporting arrangement forming part of the first conveyor and having a first item supporting surface defining a first plane; and a plurality of separate item carrying elements forming part of the second conveyor and spaced from one another parallel to the conveying direction of the second conveyor for advancing the items thereon. Each item carrying element has a second item supporting surface defining a second plane substantially identical in inclination for all the item carrying elements, and the second planes are at least approximately parallel to the first plane at least in the location of transfer.

7 Claims, 3 Drawing Figures

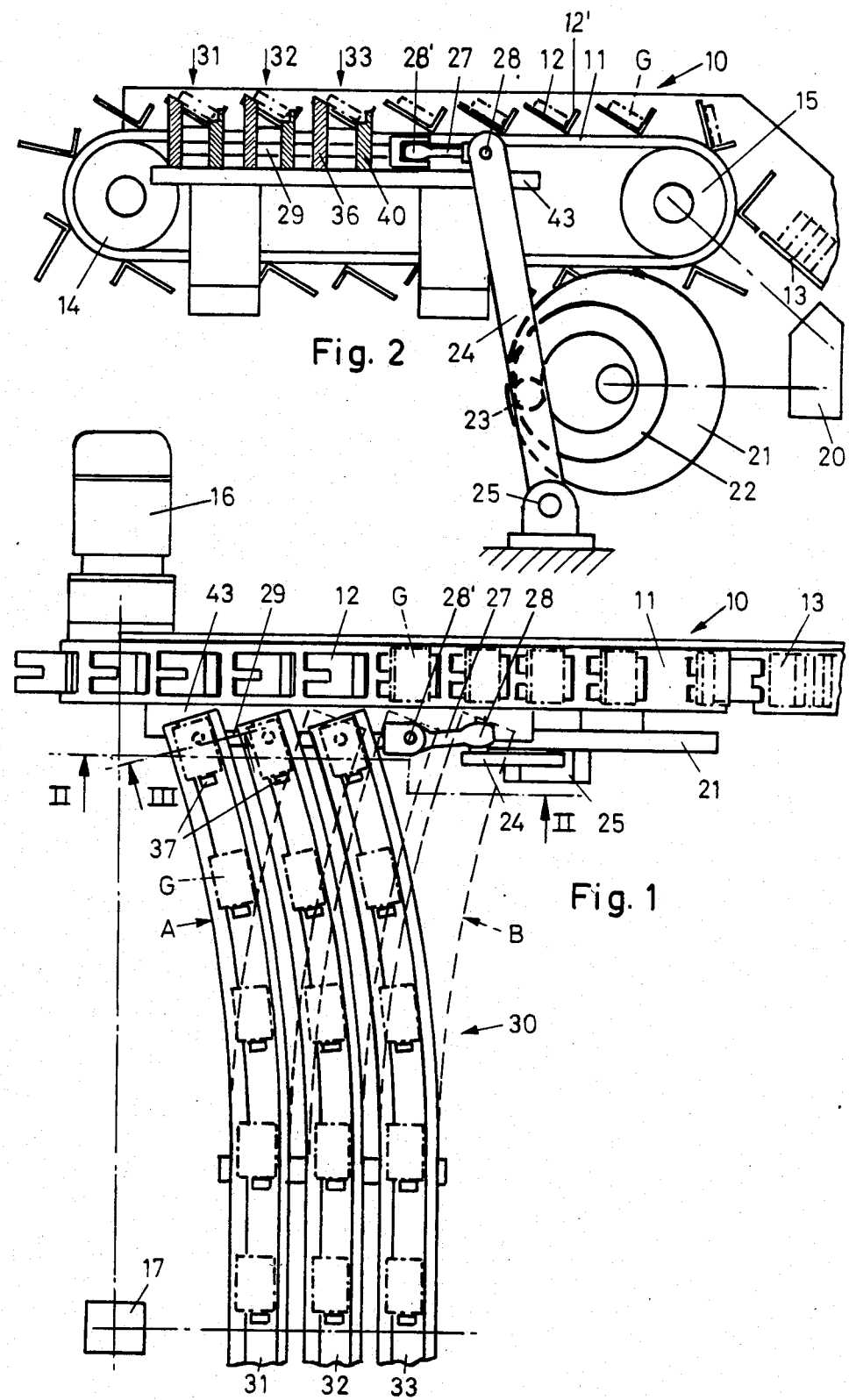

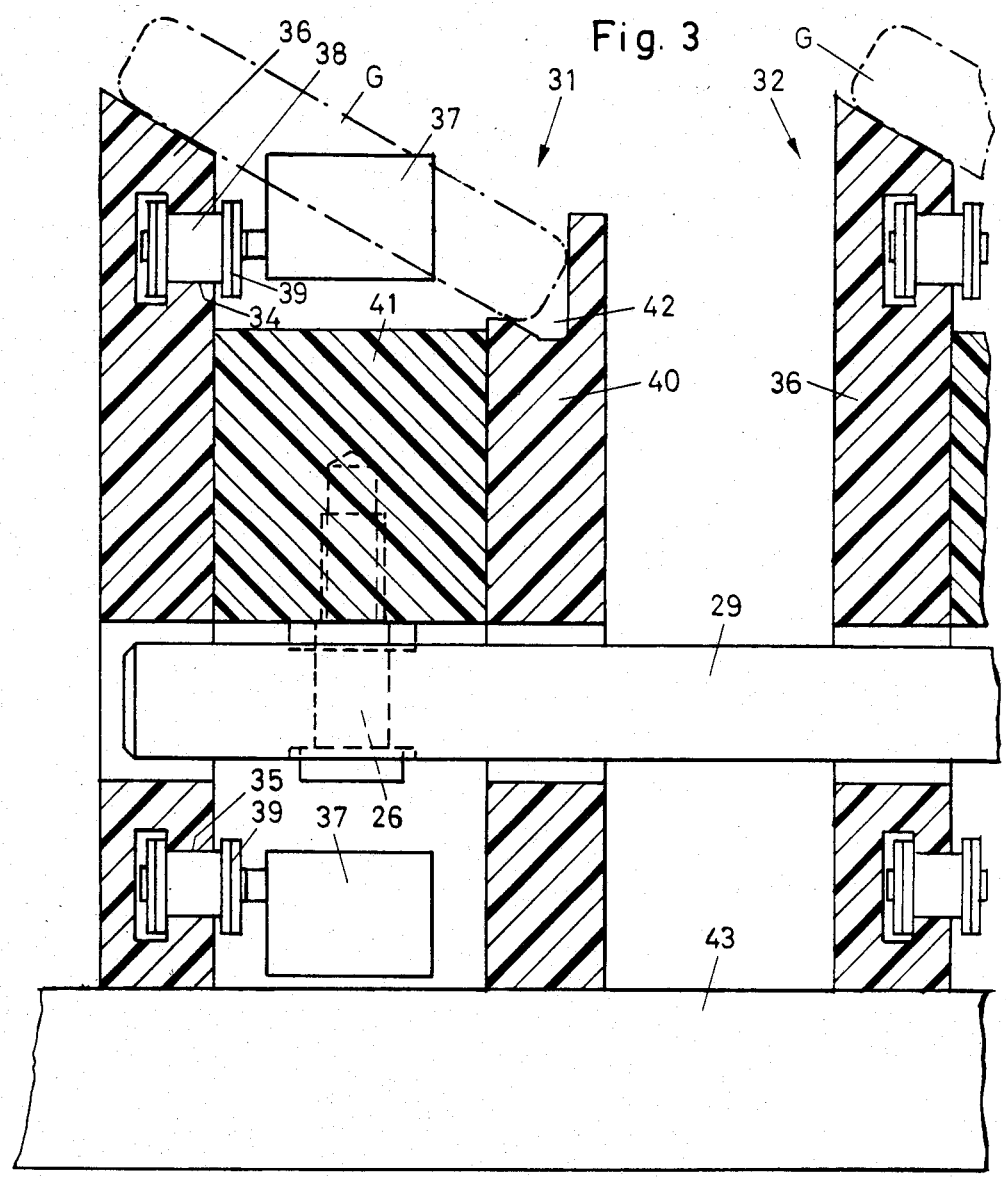

TRANSFER APPARATUS FOR FLAT ITEMS

BACKGROUND OF THE INVENTION

This invention relates to an apparatus for transferring flat items from one conveyor to another such that a principal face of the items remains downwardly oriented. The conveyor to which the items are transferred has a conveying direction which is at an angle to that of the conveyor from which the articles are taken.

Swiss Pat. No. 621,528 discloses a device for transferring groups of edgewise upwardly oriented disc-like or wafer-like flat articles. Groups formed by a plurality of such articles are transferred from a first conveyor belt to a second conveyor belt by means of article carriers. The transfer motion is perpendicular to the longitudinal axis of the article group as oriented on the first conveyor, and the second conveyor extends parallel to the group axis. The transfer is effected by means of a transfer pusher, while an acceleration pusher causes an acceleration of the article group until the latter reaches the conveying speed of the second conveyor belt. While with such a device a high transfer output is feasible, a loss of time nevertheless occurs, since the articles first have to be grouped into stacks.

SUMMARY OF THE INVENTION

It is an object of the invention to provide an improved transfer device of the above-outlined type with which articles other than disc or wafer-shaped items may be individually handled and wherein the transfer output is high.

These objects and others to become apparent as the specification progresses, are accomplished by the invention, according to which, briefly stated, the apparatus has a first conveyor and a second conveyor to which flat items, oriented downwardly with a large face thereof, are transferred from the first conveyor at a location of transfer; an item supporting arrangement forming part of the first conveyor and having a first item supporting surface defining a first plane; and a plurality of separate item carrying elements forming part of the second conveyor and spaced from one another parallel to the conveying direction of the second conveyor for advancing the items thereon. Each item carrying element has a second item supporting surface defining a second plane substantially identical in inclination for all the item carrying elements, and the second planes are at least approximately parallel to the first plane at least in the location of transfer.

BRIEF DESCRIPTION OF THE DRAWING

FIG. 1 is a schematic top plan view of a preferred embodiment of the invention.

FIG. 2 is a sectional view taken along line II—II of FIG. 1.

FIG. 3 is an enlarged sectional view taken along line III—III of FIG. 1.

DESCRIPTION OF THE PREFERRED EMBODIMENT

Turning to FIGS. 1 and 2, a conveyor generally designated at 10 comprises a conveyor belt 11 having serially and equidistantly arranged oblique article supporting elements 12 each having, at their low-lying end, an article stop 12' to accurately and identically define the position of each article G on the inclined face of the support element 12. The support elements 12 may be L-shaped components oriented such as to constitute cradle-like parts as shown in FIG. 2. The articles G are advanced on the conveyor 10 in the direction H, and at the downstream end of the conveyor 10 the support elements 12 empty their contents into a stack-forming accumulator 13. The conveyor belt 11 is conventionally supported by two end rollers 14 and 15. The end roller 14 is driven by a motor 16 while the other end roller 15 drives a gearing 20 as indicated by the broken line C.

The output of the gearing 20 rotates a cam disc 21 which has on one of its faces a cam groove (cam track) 22 into which extends a follower 23. The latter is a roller which is rotatably mounted on a one-arm lever 24 which is pivotally supported by an articulation 25 fixedly mounted on the machine frame. This arrangement ensures that the lever 24 moves in synchronism with the conveyor 10.

Also referring to FIG. 3, a conveyor group 30 has a plurality of parallel conveyors 31, 32 and 33 of identical construction. Each conveyor 31, 32 and 33 includes a conveyor chain whose upper and lower flights are guided in an upper groove 34 and a lower groove 35, respectively, of a guide plate 36. Each conveyor chain is formed of a plurality of roller elements 38 which are connected laterally with one another at opposite ends by a pair of chain links 39. The chain carries uniformly spaced, tab-like article pushers 37.

Between the guide plate 36 and a counter plate 40 spacers 41 are provided which are uniformly distributed along the length of each conveyor 31-33. The guide plate 36 has a greater height than the counter plate 41 which is provided at its top edge with a longitudinal groove or trough 42. As illustrated in phantom lines in FIG. 3, the articles G are supported at an oblique orientation by the oblique top edge face of the guide plate 36 and the walls defining the groove 42 of the counter plate 40.

The guide plates 36, the counter plates 40 and the spacers 41 of the conveyor tracks 31, 32, 33 are made of a flexible material such as nylon, and at the downstream end of the conveyors 31-33 the last spacer 41 in each conveyor is—as shown in detail in FIG. 3—articulated to a common actuating bar 29 by means of a respective pin 26. At their downstream end the guide plates 36 as well as the counter plates 40 slidably rest on a support plate 43 stationarily mounted along the conveyor 10. The actuating bar 29 is jointed to a link bar 27 by means of an articulation 28' and the link bar 27 is jointed by means of an articulation 28 to the lever 24.

The motor 16 drives a further gearing 17 which in turn effects travel of the chains of the conveyors 31, 32 and 33.

By means of the arrangement described above, articles G are continuously moved in an oblique orientation by the respective tab-like article pusher 37 of the conveyors 31, 32, 33 of the conveyor group 30. The articles are, at the downstream end of the conveyors 31, 32, 33 pushed onto oblique support surfaces 12 of the conveyor 10 by the respective article pusher 37. As shown in FIG. 2, the articles G are approximately identically inclined on the conveyor group 30 and on the conveyor 10.

The conveyors 31-33 are, by means of the cam disc drive 21-24, periodically moved from the solid-line position A (FIG. 1) into the broken-line position B. By virtue of the interconnected drives, this lateral shift is in synchronism with the article transferring pushing motions of the article pushers 37. By means of the lateral displacement of the downstream end of the conveyors 31-33, the articles to be transferred by the article pushers 37 onto the conveyor 10 are accelerated in the conveying direction of the conveyor 10 at least approximately to the same speed as that of the conveyor 10. The conveyors 31, 32, 33 are spaced from one another at a distance which corresponds to the distance between any two consecutive item carrying elements 12. This arrangement ensures that the respective pushers 37 simultaneously transfer items G from the three conveyors 31, 32, 33 to three consecutive item carrying elements 12 of the conveyor 10.

With the above-described apparatus it is feasible to transfer flat articles with a high output from a first conveyor onto a second conveyor which extends perpendicularly to the first conveyor. The number of part conveyors (conveyors 31-33) in the first conveyor (conveyor group 30) is not limited to three as shown in the described embodiment but there may be a significantly larger number of conveyors, such as eight or more. The first conveyor thus may be of compact construction, and furthermore, the articles are treated in a gentle manner so that even plastically deformable articles such as tea bags or the like may be handled in a highly satisfactory manner.

It will be understood that the above description of the present invention is susceptible to various modifications, changes and adaptations, and the same are intended to be comprehended within the meaning and range of equivalents of the appended claims.

What is claimed is:

1. In an apparatus for transferring flat items, in a substantially lying orientation, from a first conveyor to a second conveyor; said first and second conveyors having respective first and second conveying directions oriented to one another at an angle other than zero; means for transferring said items from said first conveyor to said second conveyor at a location of transfer; the improvement wherein said first conveyor comprises a guide plate and a counter plate each having a length dimension extending parallel to said first conveying direction; said guide plate and said counter plate being horizontally spaced from one another transversely to said first conveying direction and being edgewise upright oriented; further wherein said guide plate has a top item supporting edge face and said counter plate has top wall portions defining a trough extending parallel to said first conveying direction; said top item supporting edge and said trough together forming a first item supporting surface defining a first plane; and a plurality of separate item carrying elements forming part of said second conveyor and spaced from one another parallel to said second conveying direction for advancing the items thereon; each said item carrying element having a second item supporting surface defining a second plane substantially identical in inclination for all the item carrying elements; the second planes being at least approximately parallel to said first plane at least in said location of transfer.

2. An apparatus as defined in claim 1, wherein said item carrying elements of said second conveyor comprise generally L-shaped components oriented to present cradle-like supports for the items.

3. An apparatus as defined in claim 1, wherein said first conveyor is present in a plurality and further wherein the first conveyors are arranged side-by-side and spaced from one another at a distance corresponding to the distance between any two consecutive said item carrying elements.

4. An apparatus as defined in claim 1, wherein said first and second planes are inclined at an acute angle to the horizontal.

5. An apparatus as defined in claim 4, wherein said second planes slope downwardly when viewed in said second conveying direction.

6. An apparatus as defined in claim 1, wherein said first conveyor has a terminal length portion including a discharge end situated adjacent said second conveyor; said terminal length portion being arranged for a pivotal motion in a generally horizontal plane for displacement of said discharge end generally along said second conveyor along a length portion thereof; and means for oscillating said terminal length portion of said first conveyor for moving said discharge end in synchronism with the motion of said item carrying elements in said second conveying direction.

7. An apparatus as defined in claim 6, wherein at least a terminal length portion of said first conveyor is of a flexible material for permitting said pivotal motion.

* * * * *